United States Patent [19]
Schmidt et al.

[11] 3,821,334
[45] June 28, 1974

[54] PROCESS FOR THE MANUFACTURE OF P-HYDROXYBENZYL COMPOUNDS

[75] Inventors: Andreas Schmidt; Heimo Brunetti, both of Reinach, Switzerland

[73] Assignee: Ciba-Geigy Corporation, Ardsley, N.Y.

[22] Filed: Mar. 23, 1972

[21] Appl. No.: 237,526

[30] Foreign Application Priority Data
Apr. 8, 1971   Switzerland.......................... 5230/71

[52] U.S. Cl. ......... 260/932, 260/45.7 P, 260/45.85, 260/45.9, 260/45.95, 260/247.1, 260/293.73, 260/455 R, 260/455 A, 260/465 D, 260/465 F, 260/470, 260/473 S, 260/559 R, 260/559 D, 260/590, 260/607 A, 260/940, 260/941, 260/943, 260/946, 260/948, 260/949

[51] Int. Cl. ............................................. G07f 9/28

[58] Field of Search ......... 260/465 F, 465 D, 473 S, 260/455 A, 559, 470, 941, 455 R, 559 R, 932, 940, 590, 607 A

[56] References Cited
UNITED STATES PATENTS

| | | | |
|---|---|---|---|
| 3,646,110 | 2/1972 | Eggensperger et al. ............ | 260/473 |
| 3,678,095 | 7/1972 | Dexter et al. ...................... | 260/473 |

*Primary Examiner*—Lewis Gotts
*Assistant Examiner*—Dolph H. Torrence

[57] ABSTRACT p-Hydroxybenzyl compounds are prepared by reacting a p-hydroxybenzyl ester of a dithiocarbamic acid with a corresponding compound having an active hydrogen in the presence of a base. The prepared compounds are stabilizers.

5 Claims, No Drawings

PROCESS FOR THE MANUFACTURE OF P-HYDROXYBENZYL COMPOUNDS

The present invention relates to a process for the manufacture of compounds of the general formula I

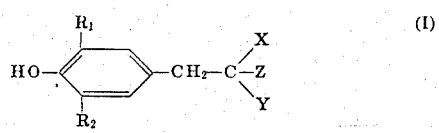

wherein $R_1$ and $R_2$ independently of one another denote alkyl or cycloalkyl, X and Y independently of one another denote

—$COOR_3$, —$COSR_3$, —$CONHR_3$,

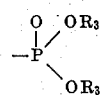

—$CON(R_4)_2$, —$COR_5$,

—$SO_2R_5$ or —CN, $R_3$ denotes alkyl, cycloalkyl, alkenyl, aralkyl, aryl, alkylthioalkyl or alkoxyalkyl, $R_4$ denotes alkyl, cycloalkyl or aralkyl, $R_5$ denotes alkyl, cycloalkyl, aralkyl or aryl and Z denotes hydrogen, alkyl, aralkyl, aryl or the group

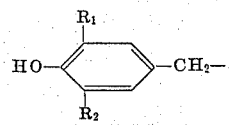

characterised in that 1 or 2 mols of a compound of the formula II

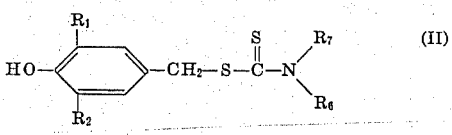

wherein $R_1$ and $R_2$ have the same meaning as under the formula I and $R_6$ and $R_7$ independently of one another denote alkyl or together, with inclusion of the nitrogen atom, denote a saturated heterocyclic 5-membered or 6-membered ring, are reacted with 1 mol of a compound of the formula III $$H-C \begin{matrix} X \\ -Z \\ Y \end{matrix} \quad (III)$$

wherein X, Y and Z have the meaning indicated under the formula I, in the presence of a base.

It is known to manufacture compounds of the formula I by reaction of a compound of the formula IV

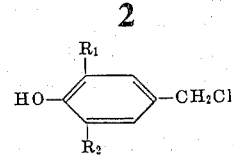

with a compound of the formula III. A disadvantage of this process is the ease of decomposition of the compounds of the formula IV and the fact that the reaction must be carried out in solvents which are as anhydrous as possible.

In comparison, the process according to the invention has the advantage that the compounds of the formula II are stable and can be stored. Furthermore, the process can be carried out in an aqueous-alcoholic medium, which means simplification and cheapening of the process.

It is furthermore known to manufacture compounds of the formula I by reaction of a compound of the formula V

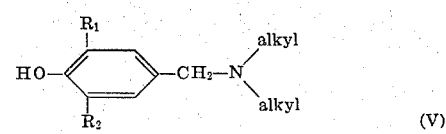

with a compound of the formula III. This process also has the disadvantage of requiring reaction conditions to be as anhydrous as possible. Furthermore, compounds of the formula I in which X and/or Y denote a COOaryl group cannot be manufactured by the above method.

In contrast, such compounds can be easily manufactured in accordance with the process of the invention, that is to say the process according to the invention has a greater breadth of application.

A further general advantage of the process according to the invention is that the reaction can be carried out at lower temperatures and with shorter reaction times, as compared with the previously known processes. These milder reaction conditions result in a better colour quality of the end product.

The alkali salt or alkaline earth salt of a dithiocarbamic acid, for example

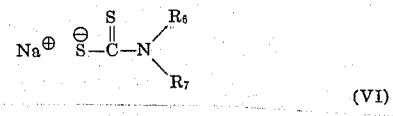

which is eliminated from the compounds of the formula II during the reaction in the process according to the invention, can furthermore be re-used for the manufacture of the compounds of the formula II.

Using the process according to the invention it is in particular possible to manufacture compounds of the formula I wherein $R_1$ and $R_2$ independently of one another represent alkyl with 1 – 8 carbon atoms or cycloalkyl with 6 – 8 carbon atoms and, in X and Y, $R_3$ represents alkyl with 1 – 20 carbon atoms, cyclohexyl, alkenyl with 3 or 4 carbon atoms, aralkyl with 7 – 9 carbon atoms, phenyl, alkylphenyl with 7 – 15 carbon atoms, alkylthioalkyl with 3 – 21 carbon atoms or alkoxyalkyl with 3 – 21 carbon atoms, the hetero-atom in the last two substituents mentioned being separated by at least two carbon atoms from the bond to the remainder of the molecule, $R_4$ represents alkyl with 1 – 18 carbon atoms, cyclohexyl or aralkyl with 7 – 9 carbon atoms and $R_5$ represents alkyl with 1 – 8 carbon atoms aralkyl with 7 – 9 carbon atoms, phenyl or alkylphenyl with 7 – 9 carbon atoms and Z denotes hydrogen, alkyl with 1 – 18 carbon atoms or the group

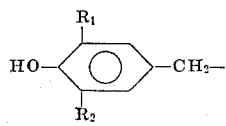

Compounds of the formula I which are particularly preferentially manufactured in accordance with the process of the invention are those wherein $R_1$ and $R_2$ independently of one another represent methyl or branched alkyl with 3 – 5 carbon atoms and, in X and Y, $R_3$ represents alkyl with 1 – 18 carbon atoms, phenyl, alkylphenyl with 7 – 15 carbon atoms, alkylthioalkyl with 3 – 20 carbon atoms or alkoxyalkyl with 3 – 20 carbon atoms, with the hetero-atom in the last two substituents mentioned being separated by at least two carbon atoms from the bond to the remainder of the molecule, $R_4$ represents alkyl with 1 – 8 carbon atoms and $R_5$ represents methyl or phenyl, and Z denotes hydrogen or the group

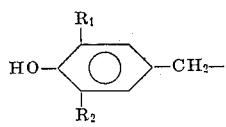

Compounds of the formula II which are preferentially used in the process according to the invention are those in which $R_1$ and $R_2$ have the abovementioned meaning and $R_6$ and $R_7$ independently of one another denote straight-chain alkyl with 1 – 8 carbon atoms or together, with inclusion of the nitrogen atom, denote a saturated heterocyclic 6-membered ring.

The substituents designated above as $R_1$, $R_2$, $R_3$, $R_4$, $R_5$, $R_6$, $R_7$ and Z may be alkyl. Within the framework of the limits indicated above, they may be methyl, ethyl, propyl, isopropyl, butyl, iso-butyl, tert.butyl, pentyl, tert. pentyl, hexyl, heptyl, octyl, nonyl, decyl, undecyl, dodecyl, tetradecyl, hexadecyl, octadecyl or eicosyl. $R_1$, $R_2$, $R_3$, $R_4$ and $R_5$ can also be cyclic alkyl groups with 6 – 8 carbon atoms. These can be cyclohexyl, methylcyclohexyl or cyclooctyl.

If $R_6$ and $R_7$, with inclusion of the nitrogen atom, form a heterocyclic 5-membered or 6-membered ring, it can be, for example, the radical of morpholine or piperidine. If $R_3$ is alkenyl, it may, for example, be allyl or methallyl, and if $R_3$, $R_4$, $R_5$ and Z are aralkyls they may, for example, be benzyl, methylbenzyl or dimethylbenzyl; if $R_3$, $R_5$ and Z are aryl, they may, for example, be phenyl, tolyl, xylyl, p-sec.butylphenyl, p-tert.butylphenyl, tert.pentylphenyl, p-tert.octylphenyl, p-nonylphenyl, p-cyclohexylphenyl or p-phenylphenyl, and if $R_3$ is alkylthioalkyl it may, for example, be methylthioethyl, ethylthioethyl, butylthioethyl, octylthioethyl, dodecylthioethyl, hexadecylthioethyl, octadecylthioethyl or hexylthiopropyl, whilst if $R_3$ is alkoxyalkyl it may, for example, be methoxyethyl, ethoxyethyl, butoxyethyl, octoxyethyl, dodecyloxyethyl, octadecyloxyalkyl or methoxypropyl.

Examples of compounds of the formula III are: malonic acid diethyl ester, malonic acid dioctadecyl ester, malonic acid di-(p-tert.octylphenyl) ester, malonic acid di-(3-thia-pentadecyl) ester, malonic acid diethylamide, malonic acid dinitrile, cyanoacetic acid methyl ester, acetylacetone, acetoacetic acid ethyl ester and cyanomethanesulphonic acid diethyl ester, and carbethoxymethylphenyl-sulphone.

The process according to the invention can be carried out by first taking the compounds of the formula II and III in a suitable solvent and adding a solution of the base dropwise at a temperature of, for example, $-20°$ to $+150°$ C, or by first taking a mixture of the base and the compound of the formula III and adding a solution of the compound of the formula II dropwise. The reaction is preferably carried out at temperatures between $0°$ and $100°$ C.

The molar ratio of the compounds II, III and the base is in these cases 1:1:1 or about 1:1:1 when introducing one benzyl group or 2:1:2 or about 2:1:2 for the introduction of two benzyl groups into a compound of the formula III. The concentrations are not critical for the process according to the invention. For the individual components, they are only limited by the solubility and can, for example, amount to 0.1 – 5 mols per litre of solution.

Examples of solvents which are used in the process according to the invention are lower alcohols, such as methanol, ethanol or isopropanol or their mixtures with water, aromatic hydrocarbons, such as benzene or toluene, ethers, such as diethyl ether, dioxane or tetrahydrofurane or aliphatic hydrocarbons, such as ligroin. Mixtures of lower alcohols with water are preferentially used.

If, in the process according to the invention, the base is added dropwise, it can be dissolved in one of the abovementioned solvents or in water. Bases which can be used according to the invention are, for example, alkali amides, such as sodium amide or lithium amide, alkali hydrides, such as lithium hydride or sodium hydride, alkali hydroxides, such as sodium, potassium or lithium hydroxide or alcoholates, such as sodium methylate, sodium ethylate or magnesium diethylate.

The alkali salts of the compounds of the formula III can also be employed as bases. They are manufactured, for example, by adding an alkali metal, such as sodium, to a solution of a compound of the formula III in an inert solvent.

The preferentially usable base is an alkali hydroxide.

The starting compounds of the formula II can be manufactured as described in U.S. Pat. No. 2,757,174, from the corresponding 2,6-dialkylphenols, formaldehyde, carbon disulphide and a dialkylamine of the formula $HNR_6R_7$.

The compounds of the formula I are suitable for use as stabilisers for monomeric and polymeric substances. They provide protection against thermo-oxidative and/or photo-induced degradation.

The invention is explained in more detail in the examples which follow.

In the formulae, —< denotes iso-propyl and + denotes tert.butyl.

Some of the compounds manufactured in the examples which follow are new, for example the compounds in Examples 7, 22, 23 and 24 and the compounds falling under the general formula XIII

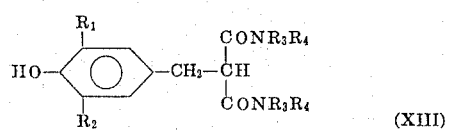

wherein $R_1$ and $R_2$ denotes alkyl with 1 to 4 carbon atoms, $R_3$ denotes benzyl or alkyl with 1 to 18 carbon atoms and $R_4$ denotes hydrogen, benzyl or alkyl with 1 to 18 carbon atoms, which compounds are manufactured in Examples 35 to 41. Amongst the compounds of the formula XIII, those wherein $R_1$ and $R_2$ denote tert.butyl, $R_3$ denotes benzyl or alkyl with 2 to 18 carbon atoms and $R_4$ denotes hydrogen, benzyl or butyl are particularly preferred.

Example 1

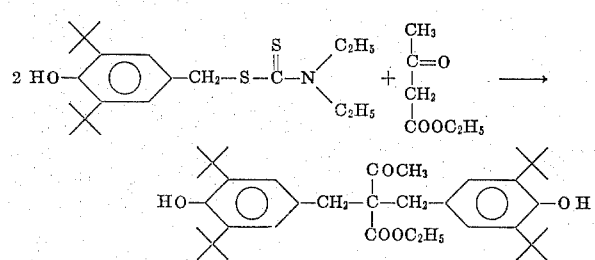

36.7 g (0.1 mol) of N,N-diethyl-dithiocarbamic acid (3,5-ditert.butyl-4-hydroxybenzyl) ester and 6.5 g (0.05 mol) of acetoacetic acid ethyl ester are dissolved in 100 ml of isopropanol under reflux. A solution of 4 g (0.1 mol) of sodium hydroxide in 11 ml of water is added dropwise at the same temperature over the course of 20 minutes, whereupon the clear solution becomes cloudy. The mixture is stirred for a further hour and cooled to 10° C, whereupon the reaction product crystallises out. 50 ml of water are added dropwise, the mole is stirred for 1 hour and the crude product is filtered off. 25 g (= 89 percent of theory) of $\alpha,\alpha$-bis-(3,5-ditert.butyl-4-hydroxybenzyl)-acetoacetic acid ethyl ester are thus obtained, melting at 133°–134° C after one recrystallisation from ligroin.

Instead of the solution of sodium hydroxide in water, a solution of 6.8 g (0.1 mol) of sodium ethylate in 20 ml of isopropanol can also be used, with equal success.

Examples 2 – 7

If instead of the acetoacetic acid ethyl ester of Example 1, equimolecular amounts of the starting products of the formula VII given below are used and otherwise the same procedure is followed, the bis-(3,5-ditert.butyl-4-hydroxybenzyl) compounds of the formula VIII are obtained in similarly good yield. The meaning of the symbols X and Y, and the melting points of the products VIII can be seen from TABLE 1:

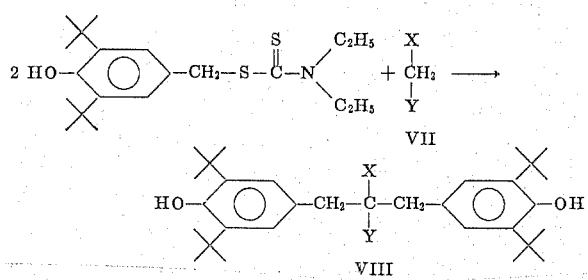

Table 1

| | X | Y | Melting point (°C) | Yield % |
|---|---|---|---|---|
| 2. | COOCH$_3$ | COOCH$_3$ | 169 | 92 |
| 3. | COOC$_2$H$_5$ | COOC$_2$H$_5$ | 162 | 82 |
| 4. | COOC$_{18}$H$_{37}$ | COOC$_{18}$H$_{37}$ | 103 | 89 |
| 5. | COCH$_3$ | COCH$_3$ | 157 | 89 |
| 6. | COOC$_2$H$_5$ | CN | 207 | 85 |
| 7. | CN | CN | 230 | 90 |

Example 8

36.8 g (0.1 mol) of malonic acid di-(4-tert.butylphenyl) ester are dissolved 150 ml of toluene. 7.8 g (0.2 mol) of sodium amide are added to this solution at 0° C. At the same temperature, a solution of 73.4 g (0.2 mol) of N,N-diethyl-dithiocarbamic acid (3,5-ditert.butyl-4-hydroxybenzyl) ester in 300 ml of toluene is added dropwise over the course of 30 minutes. The mixture is stirred for a further hour at room temperature, 300 ml of water are added and after thorough stirring the organic phase is separated off. After evaporating the dried toluene solution, 64 g (= 80 percent of theory) of bis-(3,5-ditert.butyl-4-hydroxybenzyl)-malonic acid di-(4'-tert.butylphenyl) ester are left, melting at 182° C after recrystallisation from ligroin.

Examples 9–17

If in the above Example 8 the malonic acid di-(4-tert.-butyl-phenyl) ester is replaced by the equimolecular amount of a malonic acid diaryl ester of the formula VII and otherwise the same procedure is followed, the bis-(3,5-di-tert.butyl-4-hydroxybenzyl)-malonic acid diaryl ester of the formula VIII are obtained. The meaning of the symbols X and Y, as well as yields and melting points of the products VIII, can be seen from Table 2:

TABLE 2

| | X | Y | Melting point (° C.) | Yield, percent |
|---|---|---|---|---|
| 9 | COO—⟨phenyl⟩ | COO—⟨phenyl⟩ | 145 | 75 |
| 10 | COO—⟨phenyl⟩—tert. octyl | COO—⟨phenyl⟩—tert. octyl | 180 | 85 |
| 11 | COO—⟨phenyl⟩—sec. butyl | COO—⟨phenyl⟩—sec. butyl | 132 | 90 |
| 12 | COO—⟨phenyl⟩—⟨H⟩ | COO—⟨phenyl⟩—⟨H⟩ | 188 | 65 |

TABLE 2—Continued

| | X | Y | Melting point (° C.) | Yield, percent |
|---|---|---|---|---|
| 13 | COO—⟨◯⟩—tert. amyl | COO—⟨◯⟩—tert. amyl | 135 | 60 |
| 14 | COO—⟨◯⟩ CH₃ | COO—⟨◯⟩ CH₃ | 146 | 77 |
| 15 | COO—⟨◯⟩—⟨◯⟩ | COO—⟨◯⟩—⟨◯⟩ | 210 | 59 |
| 16 | COO—⟨◯⟩—tert. hexyl | COO—⟨◯⟩—tert. hexyl | 146 | 76 |
| 17 | COO—⟨◯⟩—tert. hexyl, CH₃ | COO—⟨◯⟩—tert. hexyl, CH₃ | 150 | 76 |

Example 18

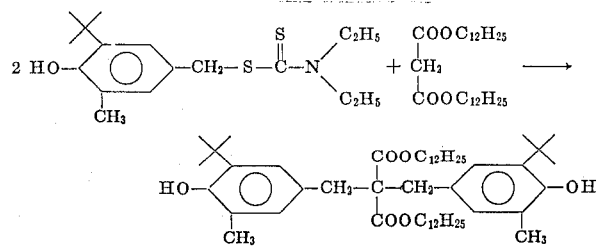

32.5 g (0.1 mol) of N,N-diethyl-dithiocarbamic acid (3-tert.butyl-4-hydroxy-5-methylbenzyl) ester and 22.0 g (0.05 mol) of malonic acid didodecyl ester are dissolved in 150 ml of isopropanol. A solution of 5.7 g (0.1 mol) of potassium hydroxide in 11 ml of water is added dropwise over the course of 20 minutes at 70°C. The yellow solution is boiled for 1 hour under reflux. After cooling, the solution is diluted with 500 ml of hexane and the hexane phase is twice washed with water, dried and evaporated. The residue slowly becomes crystalline. After recrystallisation from methanol, 30 g (76 percent of theory) of bis-(3-tert.butyl-4-hydroxy-5-methyl-benzyl)-malonic acid didodecyl ester of melting point 86° C are obtained.

Examples 19–24

If instead of the malonic acid didodecyl ester of Example 18 equivalent amounts of the starting products of the formula VII are used and otherwise the same procedure is followed, the bis-(3-tert.butyl-4-hydroxy-5-methyl) compounds of the formula IX are obtained. The meaning of the symbols X and Y and the melting points of the products IX can be seen from Table 3:

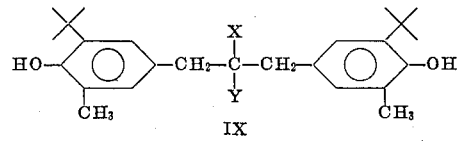

IX

TABLE 3

| | X | Y | Melting point (° C.) | Yield, percent |
|---|---|---|---|---|
| 19 | COO(CH₂)₂—S—C₁₂H₂₅ | COO(CH₂)₂—S—C₁₂H₁₅ | 40 | 69 |
| 20 | COO—⟨◯⟩—tert. octyl | COO—⟨◯⟩—tert. octyl | 171 | 88 |
| 21 | COCH₃ | COCH₃ | 189 | 58 |
| 22 | COOC₂H₅ | PO(OC₂H₅)₂ | 173 | 60 |
| 23 | CN | SO₂—⟨◯⟩ | 160 | 65 |
| 24 | COOC₂H₅ | Same as above | 151 | 75 |

Example 25

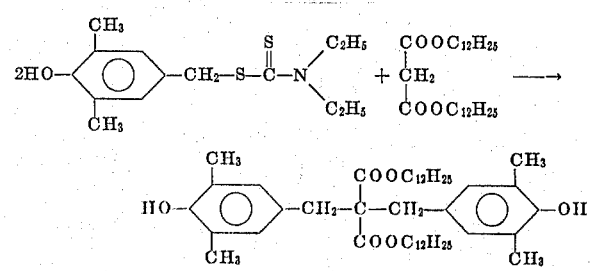

If in Example 18 the N,N-diethyl-dithiocarbamic acid-(3-tert.butyl-4-hydroxy-5-methylbenzyl) ester is replaced by an equivalent amount of N,N-diethyl-dithiocarbamic acid-(3,5-dimethyl-4-hydroxybenzyl) ester, and otherwise the same procedure is followed, bis-(3,5-dimethyl-4-hydroxybenzyl)-malonic acid didodecyl ester of melting point 78° C is obtained in 70 percent yield.

Examples 26-29

The compounds X of Table 14 are obtainable by the same procedure as in Example 25, if instead of the malonic acid didodecyl ester equivalent amounts of the starting products of the formula VII are used.

34.5 g (0.1 mol) of N,N-diethyl-dithiocarbamic acid-(3,5-di-isopropyl-4-hydroxybenzyl) ester and 29.0 g (0.05 mol) of malonic acid dioctyldecyl ester are dissolved in 150 ml of ethanol. A solution of 4 g (0.1 mol) of sodium hydroxide in 11 ml of water is added dropwise over the course of 20 minutes at 70° C. The yellow solution is boiled for 1 hour under reflux. After cooling, the solution is diluted with 500 ml of hexane and the hexane phase is twice washed with water, dried and evaporated. The residue slowly becomes crystalline. After recrystallisation from methanol, 30 g (61 percent of theory) of bis-(3,5-di-iso-propyl-4-hydroxybenzyl)-malonic acid dioctyldecyl ester of melting point 109° C are obtained.

Examples 31-32

The compounds XI of Table 5 are obtainable by the same procedure as in Example 30 if instead of the malonic acid dioctyldecyl ester equivalent amounts of the starting products of the formula VII are used.

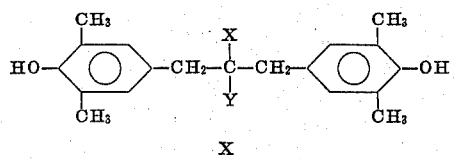

X

TABLE 4

| | X | Y | Melting point (° C.) | Yield, percent |
|---|---|---|---|---|
| 26 | COOC$_2$H$_5$ | COOC$_2$H$_5$ | 188 | 73 |
| 27 | COOC$_{18}$H$_{37}$ | COOC$_{18}$H$_{37}$ | 90 | 62 |
| 28 | COO(CH$_2$)$_2$—S—C$_{12}$H$_{25}$ | COO(CH$_2$)$_2$—S—C$_{12}$H$_{25}$ | 68 | 95 |
| 29 | COO—⟨O⟩—tert. octyl | COO—⟨O⟩—tert. octyl | 185 | 68 |

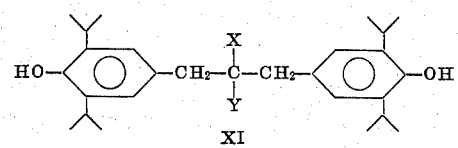

XI

TABLE 5

| | X | Y | Melting point (° C.) | Yield, percent |
|---|---|---|---|---|
| 31 | COOC$_2$H$_5$ | COOC$_2$H$_5$ | 160 | 70 |
| 32 | COO—⟨O⟩—tert. octyl | COO—⟨O⟩—tert. octyl | 148 | 50 |

Example 30

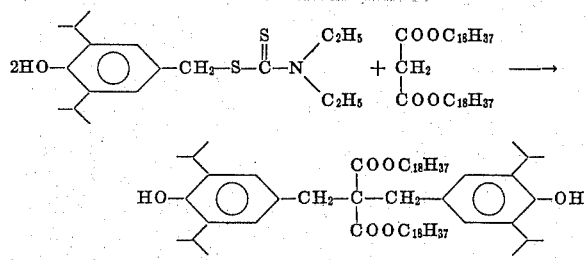

Example 33

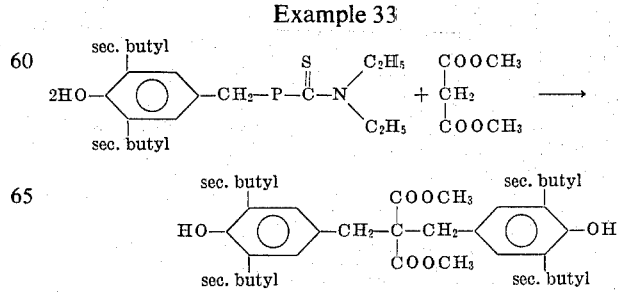

N,N-Diethyl-dithiocarbamic acid-(3,5-di-sec.butyl-4-hydroxybenzyl) ester was manufactured in accordance with the known process. After purification by chromatography on silica gel, the substance is a slightly yellow oil. 36.7 g (0.1 mol) of N,N-diethyl-dithiocarbamic acid-(3,5-di-sec.butyl-4-hydroxybenzyl) ester and 6.6 g (0.05 mol) of malonic acid dimethyl ester are dissolved in 100 ml of isopropanol under reflux. A solution of 4 g (0.1 mol) of sodium hydroxide in 11 ml of water is added dropwise at the same temperature over the course of 20 minutes, whereupon the clear solution becomes cloudy. The mixture is stirred for a further hour and cooled to 10° C, whereupon the reaction product crystallises out. 50 ml of water are added dropwise, the whole is stirred for 1 hour and the crude product is filtered off. 25 g (88 percent of theory) of bis-(3,5-di-sec.butyl-4-hydroxybenzyl)-malonic acid dimethyl ester, melting at 90° C, are thus obtained.

Example 34

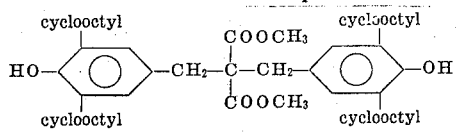

N,N-Diethyl-dithiocarbamic acid-(3,5-dicyclooctyl-4-hydroxybenzyl) ester was manufactured from 2,6-dicyclooctylphenol, formaldehyde, carbon disulphide and diethylamine in accordance with the known process. After recrystallisation from hexane, the substance melts at 80° C.

If, in Example 33, the N,N-diethyl-dithiocarbamic acid-(3,5-di-sec.butyl-4-hydroxybenzyl) ester is replaced by an equivalent amount of N,N-diethyl-dithiocarbamic acid-(3,5-di-cyclooctyl-4-hydroxybenzyl) ester and otherwise the same procedure is followed, 30 g (89 percent of theory) of bis-(3,5-di-cyclooctyl-4-hydroxybenzyl)-malonic acid dimethyl ester of melting point 172° C are obtained.

Example 35

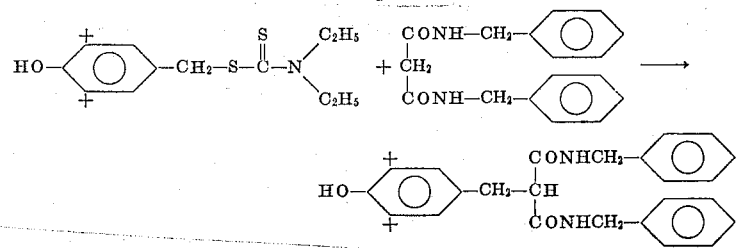

28.2 g (0.1 mol) of malonic acid N,N'-dibenzylamide and 3.9 g (0.1 mol) of sodium amide are suspended in 150 ml of toluene at room temperature. A solution of 36.7 g (0.1 mol) of N,N'-diethyl-dithiocarbamic acid-(3,5-ditert.butyl-4-hydroxybenzyl) ester in 150 ml of toluene is added dropwise at the same temperature over the course of 30 minutes. The mixture is stirred at 50° C for a further hour and 200 ml of water and 200 ml of hexane are added, whereupon the product crystallises. After briefly stirring the mixture, the crude product is filtered off. 43 g (86 percent of theory) of 3,5-ditert.butyl-4-hydroxybenzyl-malonic acid N,N-dibenzylamide are thus obtained, melting at 202° C after one recrystallisation from methanol.

Examples 36 – 41

If instead of the malonic acid N,N'-dibenzylamide of Example 35 an equimolecular amount of a substituted malonic acid diamide of the formula X—CH$_2$—Y is used and otherwise the same procedure is followed, the nitrogen-substituted 3,5-ditert.butyl-4-hydroxybenzyl-malonic acid diamides of the formula XII are obtained. The meaning of the symbols X and Y and the melting points of the products XII can be seen from Table 6.

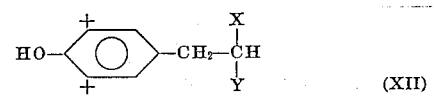

(XII)

Table 6

| | X | Y | Melting point °C | Yield % |
|---|---|---|---|---|
| 36. | CONH-C$_2$H$_5$ | CONH-C$_2$H$_5$ | 212 | 90 |
| 37. | CONH-C$_4$H$_9$ | CONH-C$_4$H$_9$ | 150 | 82 |
| 38. | CONH-C$_8$H$_{17}$ | CONH-C$_8$H$_{17}$ | 111 | 85 |
| 39. | CONH-C$_{12}$H$_{25}$ | CONH-C$_{12}$H$_{25}$ | 106 | 72 |
| 40. | CONH-C$_{18}$H$_{37}$ | CONH-C$_{18}$H$_{37}$ | 105 | 75 |
| 41. | CON(C$_4$H$_9$)$_2$ | CON(C$_4$H$_9$)$_2$ | 77 | 81 |

We claim:
1. A process for the manufacture of a compound of the general formula I

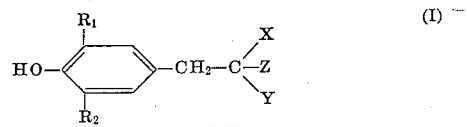

(I)

wherein
R$_1$ and R$_2$ independently of one another are alkyl with 1 to 8 carbon atoms or cycloalkyl with 6 to 8 carbon atoms,
X and Y independently of one another are —COOR$_3$, —COSR$_3$, —CONHR$_3$,

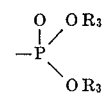

—CON(R$_4$)$_2$, —COR$_5$, —SO$_2$R$_5$ or —CN,
R$_3$ is alkyl with 1 to 20 carbon atoms, cyclohexyl, alkenyl with 3 or 4 carbon atoms, aralkyl with 7 to 9 carbon atoms, phenyl, alkylphenyl with 7 to 15 carbon atoms, alkylthioalkyl with 3 to 21 carbon atoms or alkoxyalkyl with 3 to 21 carbon atoms, the hetero-atom in the last two substituents mentioned being separated by at least two carbon atoms from the bond to the remainder of the molecule, R$_4$ is alkyl with 1 to 18 carbon atoms, cyclohexyl, aralkyl with 7 to 9 carbon atoms, phenyl or alkylphenyl with 7 to 15 carbon atoms and R$_5$ represents alkyl with 1 to 8 carbon atoms, aralkyl with 7 to 9 carbon atoms, phenyl or alkylphenyl with 7 to 9 carbon atoms, and Z is hydrogen, alkyl with 1 to 18 carbon atoms or the group

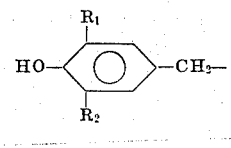

which comprises reacting 1 or 2 moles of a compound of the formula II

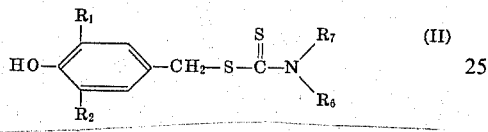

wherein
R$_1$ and R$_2$ are as defined above and
R$_6$ and R$_7$ independently of one another are straight-chain alkyl with 1 to 8 carbon atoms or together, with inclusion of the nitrogen atom, is a saturated heterocyclic 6-membered ring, with 1 mole of a compound of the formula III

wherein X, Y and Z are as defined above, at a temperature of from −20° to 150° C in the presence of a base and a solvent.

2. The process according to claim 1, wherein the solvent is a lower alcohol, a mixture of a lower alcohol with water, an aromatic or aliphatic hydrocarbon, or an ether.

3. Process according to claim 1, characterised in that in the formula I, R$_1$ and R$_2$ independently of one another denote methyl or branched alkyl with 3 – 5 carbon atoms, and, in X and Y, R$_3$ denotes alkyl with 1 – 18 carbon atoms, phenyl, alkylphenyl with 7 – 15 carbon atoms, alkylthioalkyl with 3 – 20 carbon atoms or alkoxyalkyl with 3 – 20 carbon atoms, with the hetero-atom in the last two substituents mentioned being separated by at least two carbon atoms from the bond to the remainder of the molecule, R$_4$ denotes alkyl with 1 – 8 carbon atoms and R$_5$ denotes methyl or phenyl, and Z denotes hydrogen or the group

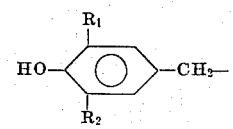

and R$_6$ and R$_7$ independently of one another denote straight-chain alkyl with 1 – 8 carbon atoms or together, with inclusion of the nitrogen atom, denote a saturated heterocyclic 6-membered ring.

4. Process according to claim 1, characterised in that alkali hydroxide is used as the base.

5. Process according to claim 1, characterised in that sodium hydroxide is used as the base.

* * * * *